US010474124B2

(12) United States Patent
Tamai

(10) Patent No.: US 10,474,124 B2
(45) Date of Patent: Nov. 12, 2019

(54) IMAGE PROCESSING SYSTEM, IMAGE PROCESSING DEVICE, METHOD OF RECONFIGURING CIRCUIT IN FPGA, AND PROGRAM FOR RECONFIGURING CIRCUIT IN FPGA

(71) Applicant: OMRON Corporation, Kyoto (JP)

(72) Inventor: Toshinori Tamai, Nara (JP)

(73) Assignee: OMRON Corporation, Kyoto (JP)

(*) Notice: Subject to any disclaimer, the term of this patent is extended or adjusted under 35 U.S.C. 154(b) by 113 days.

(21) Appl. No.: 15/820,451

(22) Filed: Nov. 22, 2017

(65) Prior Publication Data

US 2018/0224825 A1 Aug. 9, 2018

(30) Foreign Application Priority Data

Feb. 8, 2017 (JP) ................. 2017-021058

(51) Int. Cl.
*G05B 19/402* (2006.01)
*G06T 7/73* (2017.01)
(Continued)

(52) U.S. Cl.
CPC ............. *G05B 19/402* (2013.01); *G06T 1/20* (2013.01); *G06T 7/0004* (2013.01); *G06T 7/73* (2017.01);
(Continued)

(58) Field of Classification Search
CPC ... B23H 1/08; B25J 9/161; B25J 9/163; B25J 9/1669; B25J 9/1687; B25J 9/1692;
(Continued)

(56) References Cited

U.S. PATENT DOCUMENTS 5,379,347 A * 1/1995 Kato ................. G01N 21/9515
348/128
7,177,459 B1 * 2/2007 Watanabe ............. B25J 9/1697
382/151
(Continued)

FOREIGN PATENT DOCUMENTS

DE 102004048942 6/2005
DE 102016213663 2/2018
(Continued)

OTHER PUBLICATIONS

"Office Action of Germany Counterpart Application", dated Jan. 18, 2019, with English translation thereof, p. 1-p. 12.

*Primary Examiner* — Xuemei G Chen
(74) *Attorney, Agent, or Firm* — JCIPRNET

(57) ABSTRACT

An image processing system which can execute various image processings in an operation process of a robot is provided. The image processing system includes: a robot for performing a predetermined operation on a workpiece; a photographing unit for photographing the workpiece; an acquisition unit for acquiring a position of the robot; a field programmable gate array (FPGA) for reconfiguring an internal circuit configuration; a storage unit for storing area information where circuit information for implementing predetermined image processing on an image obtained from the photographing unit as information for defining the circuit configuration of the FPGA is defined for each operation area of the robot; and a reconfiguration unit for reconfiguring the circuit configuration of the FPGA with the circuit information associated with the operation area based on that a position of the robot sequentially acquired by the acquisition unit belongs to one operation area defined in the area information.

8 Claims, 10 Drawing Sheets

(51) Int. Cl.
   *G06T 1/20* (2006.01)
   *G06T 7/00* (2017.01)
(52) U.S. Cl.
   CPC ............ *G05B 2219/31081* (2013.01); *G06T 2207/10012* (2013.01); *G06T 2207/30164* (2013.01); *Y10S 901/01* (2013.01)
(58) Field of Classification Search
   CPC ........ B25J 9/1697; B25J 13/06; B25J 19/023; G01N 21/9515; G05D 1/0094; G06K 9/4604; G06K 9/4671; G06K 9/6253; G06T 7/00; G06T 7/80; G06T 7/73; G06T 1/20; G06T 7/0004; G06T 2207/10012; G06T 2207/30164; G05B 19/402; G05B 2219/31081; Y10S 901/01
   USPC ........ 348/222.1, 128; 382/151, 153; 700/87; 706/12
   See application file for complete search history.

(56) References Cited

U.S. PATENT DOCUMENTS

| | | | | |
|---|---|---|---|---|
| 8,965,104 B1* | 2/2015 | Hickman | ............... | G06T 7/00 382/153 |
| 9,560,232 B2* | 1/2017 | Suzuki | ............... | H04N 1/00912 |
| 9,604,360 B2* | 3/2017 | Suga | ............... | B25J 9/163 |
| 9,607,244 B2* | 3/2017 | Minato | ............... | G06K 9/4604 |
| 9,905,016 B2* | 2/2018 | Amagata | ............... | B25J 9/1605 |
| 10,037,591 B2* | 7/2018 | Ichikawa | ............... | G06F 17/5054 |
| 2005/0222696 A1* | 10/2005 | Ozaki | ............... | B25J 9/161 700/87 |
| 2005/0231332 A1* | 10/2005 | Nihei | ............... | B25J 13/06 340/286.13 |
| 2008/0301072 A1* | 12/2008 | Nagatsuka | ............... | B25J 9/1669 706/12 |
| 2009/0033758 A1* | 2/2009 | Nishiyama | ............... | G06K 9/6253 348/222.1 |
| 2016/0271796 A1* | 9/2016 | Babu | ............... | G05D 1/0094 |
| 2017/0061626 A1* | 3/2017 | Otake | ............... | G06K 9/4671 |
| 2017/0140539 A1* | 5/2017 | Wang | ............... | B25J 9/1687 |
| 2017/0341172 A1* | 11/2017 | Oonishi | ............... | B23H 1/08 |
| 2018/0093380 A1* | 4/2018 | Yoshida | ............... | B25J 19/023 |
| 2018/0154523 A1* | 6/2018 | Jeong | ............... | B25J 9/1692 |
| 2018/0178389 A1* | 6/2018 | Aiso | ............... | G06T 7/80 |

FOREIGN PATENT DOCUMENTS

| | | |
|---|---|---|
| DE | 112015006669 | 3/2018 |
| JP | 2003211382 | 7/2003 |
| JP | 2011136377 | 7/2011 |
| JP | 2015136764 | 7/2015 |

* cited by examiner

144A

| OPERATION AREA OF ROBOT | CIRCUIT INFORMATION |
|---|---|
| AR1 | COMMAND CODE 1 (NORMAL PHOTOGRAPHING) |
| AR2 | COMMAND CODE 2 (HDR COMBINING) |
| AR3 | COMMAND CODE 3 (ILLUMINANCE DIFFERENCE STEREO) |
| ⋮ | ⋮ |

FIG. 5

IMAGE PROCESSING SYSTEM, IMAGE PROCESSING DEVICE, METHOD OF RECONFIGURING CIRCUIT IN FPGA, AND PROGRAM FOR RECONFIGURING CIRCUIT IN FPGA

CROSS-REFERENCE TO RELATED APPLICATION

This application claims the priority benefit of Japan application serial no. 2017-021058, filed on Feb. 8, 2017. The entirety of the above-mentioned patent application is hereby incorporated by reference herein and made a part of this specification.

BACKGROUND OF THE INVENTION

Field of the Invention

The disclosure relates to technology for reconfiguring a circuit configuration of an FPGA in a workpiece measurement process.

Description of Related Art

In the field of factory automation (FA), robots for performing a predetermined operation on a workpiece have become widespread. In relation to control of such robots, Japanese Patent Application Laid-Open (JP-A) No. 2003-211382 (Patent Document 1) discloses a robot control device "for performing visual feedback control of a position/orientation of a robot arm on the basis of captured image data of a camera (a so-called visual servo)."

As an example of an operation to be performed by the robot, the robot performs an operation of picking up a loaded workpiece and attaching the workpiece to another workpiece. In an operation process, a measurement process such as a workpiece position detection process or a workpiece inspection process is performed. The workpiece measurement process is implemented by executing various types of image processing on an image obtained by photographing the workpiece.

The image processing to be executed in the workpiece measurement process is, for example, executed by a central processing unit (CPU) or an FPGA. Because a processing speed of the FPGA is typically higher than a processing speed of the CPU, image processing having a desired processing speed is executed by the FPGA.

However, if a circuit size inside the FPGA is small, feasible image processing is limited. On the other hand, various types of image processing are executed in an operation process of a workpiece by the robot. Therefore, technology for executing various types of image processing in accordance with an operation process of the robot even if the FPGA has a small circuit size is desired.

[Patent Document 1] Japanese Patent Application Laid-Open (JP-A) No. 2003-211382

SUMMARY OF THE INVENTION

According to one or some of exemplary embodiments of the invention, an image processing system includes: a robot for performing a predetermined operation on a workpiece; a photographing unit for photographing the workpiece; an acquisition unit for acquiring a position of the robot; an FPGA configured to reconfigure an internal circuit configuration; a storage unit for storing area information in which circuit information for implementing predetermined image processing on an image obtained from the photographing unit as information for defining the circuit configuration of the FPGA is defined for each operation area of the robot; and a reconfiguration unit for reconfiguring the circuit configuration of the FPGA with the circuit information associated with the operation area on the basis of the fact that a position of the robot sequentially acquired by the acquisition unit belongs to any one of operation areas defined in the area information.

According to one or some of exemplary embodiments of the invention, an image processing device configured to communicate with a robot for performing a predetermined operation on a workpiece includes: a photographing unit for photographing the workpiece; an acquisition unit for acquiring a position of the robot; an FPGA configured to reconfigure an internal circuit configuration; a storage unit for storing area information in which circuit information for implementing predetermined image processing on an image obtained from the photographing unit as information for defining the circuit configuration of the FPGA is defined for each operation area of the robot; and a reconfiguration unit for reconfiguring the circuit configuration of the FPGA with to the circuit information associated with the operation area on the basis of the fact that a position of the robot sequentially acquired by the acquisition unit belongs to any one of operation areas defined in the area information.

According to one or some of exemplary embodiments of the invention, a method of reconfiguring a circuit in an FPGA includes the steps of: acquiring a position of a robot for performing a predetermined operation on a workpiece; preparing area information in which circuit information for implementing predetermined image processing on an image obtained by photographing the workpiece as information for defining the circuit configuration of the FPGA is defined for each operation area of the robot; and reconfiguring the circuit configuration of the FPGA with the circuit information associated with the operation area on the basis of the fact that a position of the robot sequentially acquired in the acquiring step belongs to any one of operation areas defined in the area information.

According to one or some of exemplary embodiments of the invention, a program for reconfiguring a circuit in an FPGA causes a computer to execute the steps of: acquiring a position of a robot for performing a predetermined operation on a workpiece; preparing area information in which circuit information for implementing predetermined image processing on an image obtained by photographing the workpiece as information for defining the circuit configuration of the FPGA is defined for each operation area of the robot; and reconfiguring the circuit configuration of the FPGA with the circuit information associated with the operation area on the basis of the fact that a position of the robot sequentially acquired in the acquiring step belongs to any one of operation areas defined in the area information.

BRIEF DESCRIPTION OF THE DRAWINGS

FIG. 5 is a diagram illustrating an example of area information.

DESCRIPTION OF THE EMBODIMENTS

Figure 1:
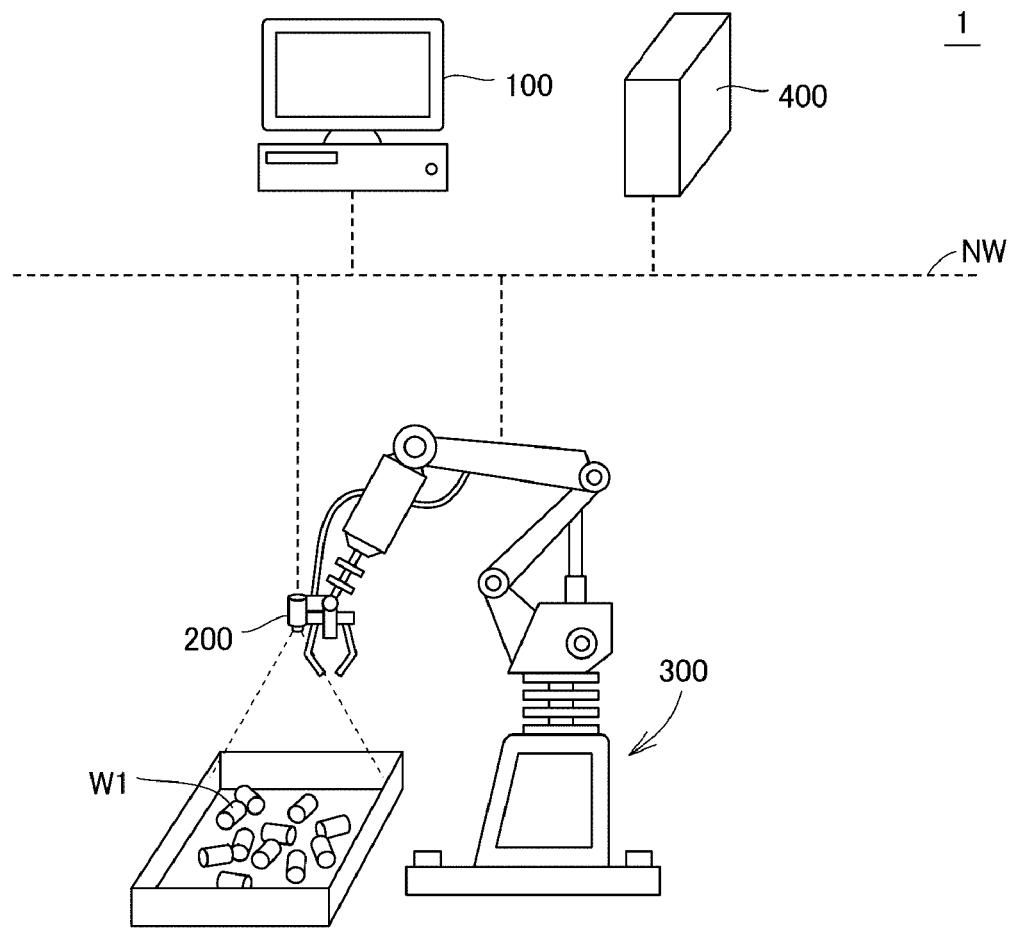
FIG. 1 is a diagram illustrating an example of a system configuration of an image processing system according to an embodiment.

According to one or some of exemplary embodiments of the invention, an image processing system includes: a robot for performing a predetermined operation on a workpiece; a photographing unit for photographing the workpiece; an acquisition unit for acquiring a position of the robot; an FPGA configured to reconfigure an internal circuit configuration; a storage unit for storing area information in which circuit information for implementing predetermined image processing on an image obtained from the photographing unit as information for defining the circuit configuration of the FPGA is defined for each operation area of the robot; and a reconfiguration unit for reconfiguring the circuit configuration of the FPGA with the circuit information associated with the operation area on the basis of the fact that a position of the robot sequentially acquired by the acquisition unit belongs to any one of operation areas defined in the area information.

According to one or some of exemplary embodiments of the invention, the image processing system further includes: a setting unit configured to provide a user interface for setting the area information. The user interface is configured to receive a selection operation of selecting one or more image processings from among one or more image processings installed in advance, and is configured to receive a registration operation of registering the image processing selected in the selection operation and an operation area including a current position of the robot in the area information.

According to one or some of exemplary embodiments of the invention, the image processing system further includes an operation unit for receiving a driving operation of driving the robot. The user interface is configured to receive the registration operation after a position of the robot is designated in the driving operation.

According to one or some of exemplary embodiments of the invention, the user interface displays a current position of the robot in conjunction with driving of the robot in the driving operation.

According to one or some of exemplary embodiments of the invention, the FPGA executes image processing on an image according to a current circuit configuration on the basis of acquisition of the image from the photographing unit.

According to one or some of exemplary embodiments of the invention, an image processing device configured to communicate with a robot for performing a predetermined operation on a workpiece includes: a photographing unit for photographing the workpiece; an acquisition unit for acquiring a position of the robot; an FPGA configured to reconfigure an internal circuit configuration; a storage unit for storing area information in which circuit information for implementing predetermined image processing on an image obtained from the photographing unit as information for defining the circuit configuration of the FPGA is defined for each operation area of the robot; and a reconfiguration unit for reconfiguring the circuit configuration of the FPGA with the circuit information associated with the operation area on the basis of the fact that a position of the robot sequentially acquired by the acquisition unit belongs to any one of operation areas defined in the area information.

According to one or some of exemplary embodiments of the invention, a method of reconfiguring a circuit in an FPGA includes the steps of: acquiring a position of a robot for performing a predetermined operation on a workpiece; preparing area information in which circuit information for implementing predetermined image processing on an image obtained by photographing the workpiece as information for defining the circuit configuration of the FPGA is defined for each operation area of the robot; and reconfiguring the circuit configuration of the FPGA with the circuit information associated with the operation area on the basis of the fact that a position of the robot sequentially acquired in the acquiring step belongs to any one of operation areas defined in the area information.

According to one or some of exemplary embodiments of the invention, a program for reconfiguring a circuit in an FPGA causes a computer to execute the steps of: acquiring a position of a robot for performing a predetermined operation on a workpiece; preparing area information in which circuit information for implementing predetermined image processing on an image obtained by photographing the workpiece as information for defining the circuit configuration of the FPGA is defined for each operation area of the robot; and reconfiguring the circuit configuration of the FPGA with the circuit information associated with the operation area on the basis of the fact that a position of the robot sequentially acquired in the acquiring step belongs to any one of operation areas defined in the area information.

According to one or some of exemplary embodiments of the invention, it is possible to execute various types of image processing in accordance with an operation process of the robot even if the FPGA has a small circuit size.

The foregoing and other objects, features, aspects and advantages of the disclosure will become apparent from the following detailed description related to the invention when taken in conjunction with the accompanying drawings.

Hereinafter, embodiments according to the invention will be described with reference to the drawings. In the following description, the same parts and components are denoted by the same reference signs. Their names and functions are the same. Therefore, detailed descriptions thereof will not be repeated. Embodiments and modified examples to be described below may be appropriately and selectively combined.

[A. System Configuration]

An overview of an image processing system 1 according to the present embodiment will be described with reference to FIG. 1. FIG. 1 is a diagram illustrating an example of a system configuration of the image processing system 1 according to the present embodiment.

The image processing system 1 is, for example, embedded in a production line or the like and performs a process of picking up a workpiece W1 which is a product or a semi-product loaded on a tray or the like one by one and attaching the picked-up workpiece W1 to a workpiece W2. Although a case in which a small number of workpieces W1 are located within the tray is illustrated in FIG. 1 to facilitate understanding, a large number of workpieces W1 may be arranged in an overlapping state.

The image processing system 1, for example, includes a setting device 100, an image processing device 200 for photographing the workpieces W1 and W2, a robot 300 for performing a predetermined operation on the workpieces W1 and W2, and a controller 400 for controlling the robot 300.

The setting device 100, the image processing device 200, the robot 300, and the controller 400 are configured so that they can perform communication with one another through a network NW. As an example, EtherCAT (registered trademark), EtherNET (registered trademark), or the like is adopted as the network NW.

The setting device 100 is an information processing terminal for performing a setting of the image processing device 200 and is, for example, a personal computer (PC), a tablet terminal, a smartphone, or the like. The setting device 100 provides a user interface capable of designing any measurement process by combining any type of image processing. The user interface receives an operation of selecting one or more image processings from a library installed in advance and an operation of designating an order of execution with respect to each image processing of a selection target selected through the operation. The execution order of the image processing is, for example, designated in an arrangement order of image processing of the selection target. A designer can design any measurement process by iterating an operation of selecting image processing and an operation of designating an order of execution. Hereinafter, a series of image processing combined by the user is referred to as a "user-set measurement process." The image processing device 200 converts the user-set measurement process in a format capable of being executed by the image processing device 200 on the basis of reception of a compile instruction (or a build instruction) and generates execution data. The generated execution data is transmitted to the image processing device 200.

The image processing device 200 stores the execution data on the basis of reception of the execution data from the setting device 100. Thereafter, the image processing device 200 reads the execution data on the basis of an arrival of a timing at which a process of measuring the workpieces W1 and W2 is executed and implements the user-set measurement process. If the workpiece detection process is set as the user-set measurement process, the image processing device 200 detects the workpieces from the image obtained from a camera (a photographing unit) and transmits a detected workpiece position of a camera coordinate system to the controller 400.

The controller 400 is a control device for controlling the robot 300 and is, for example, a programmable logic controller (PLC). Alternatively, the controller 400 may be a so-called industrial personal computer (IPC). The controller 400 converts the workpiece position of the camera coordinate system detected by the image processing device 200 into a coordinate value of a world coordinate system in accordance with a predetermined conversion equation. The controller 400 moves an arm of the robot 300 to the converted coordinate value and outputs a pickup command of the workpiece W1.

Also, although an example in which the image processing system 1 includes a single setting device 100 is shown in the example of FIG. 1, the image processing system 1 may include a plurality of setting devices 100. Although an example in which the image processing system 1 includes a single image processing device 200 is shown in the example of FIG. 1, the image processing system 1 may include a plurality of image processing devices 200. Although an example in which the image processing system 1 includes a single robot 300 is shown in the example of FIG. 1, the image processing system 1 may include a plurality of robots 300. Although an example in which the image processing system 1 includes a single controller 400 is shown in the example of FIG. 1, the image processing system 1 may include a plurality of controllers 400.

Also, although an example in which the image processing device 200 and the robot 300 are integrally configured is shown in the example of FIG. 1, the image processing device 200 and the robot 300 may be separately configured. That is, the image processing device 200 may be provided on the robot 300 or provided at a different position from the robot 300.

[B. FPGA Reconfiguration Process]

The image processing device 200 includes a plurality of types of control devices such as a CPU and an FPGA. A processing speed of the FPGA is typically higher than a processing speed of the CPU. In the FPGA, a function of dynamically reconfiguring a circuit configuration when the process is in execution (a so-called partial reconfiguration (PR)) may be provided. It is possible to virtually extend a circuit scale of the FPGA by appropriately reconfiguring the circuit of the FPGA. The image processing system 1 according to the present embodiment reconfigures the circuit configuration of the FPGA in accordance with a position of the robot 300.

As an example, a correspondence relationship between an operation area of the robot 300 and circuit information about a circuit configuration of the FPGA is pre-defined as area information. Details of the area information will be described below. The operation area defined in the area information corresponds to a region through which an arm part of the robot 300 is likely to pass in a course of the workpiece measurement process. The image processing device 200 periodically acquires a position of the robot 300 from the controller 400 and reconfigures the circuit configuration of the FPGA in circuit information associated with the operation area on the basis of the fact that the position belongs to any one of the operation areas defined in the area information. Thereby, the image processing device 200 can execute various types of image processing in accordance with an operation process of the robot 300 even when the circuit size of the FPGA is small.

Figure 2:
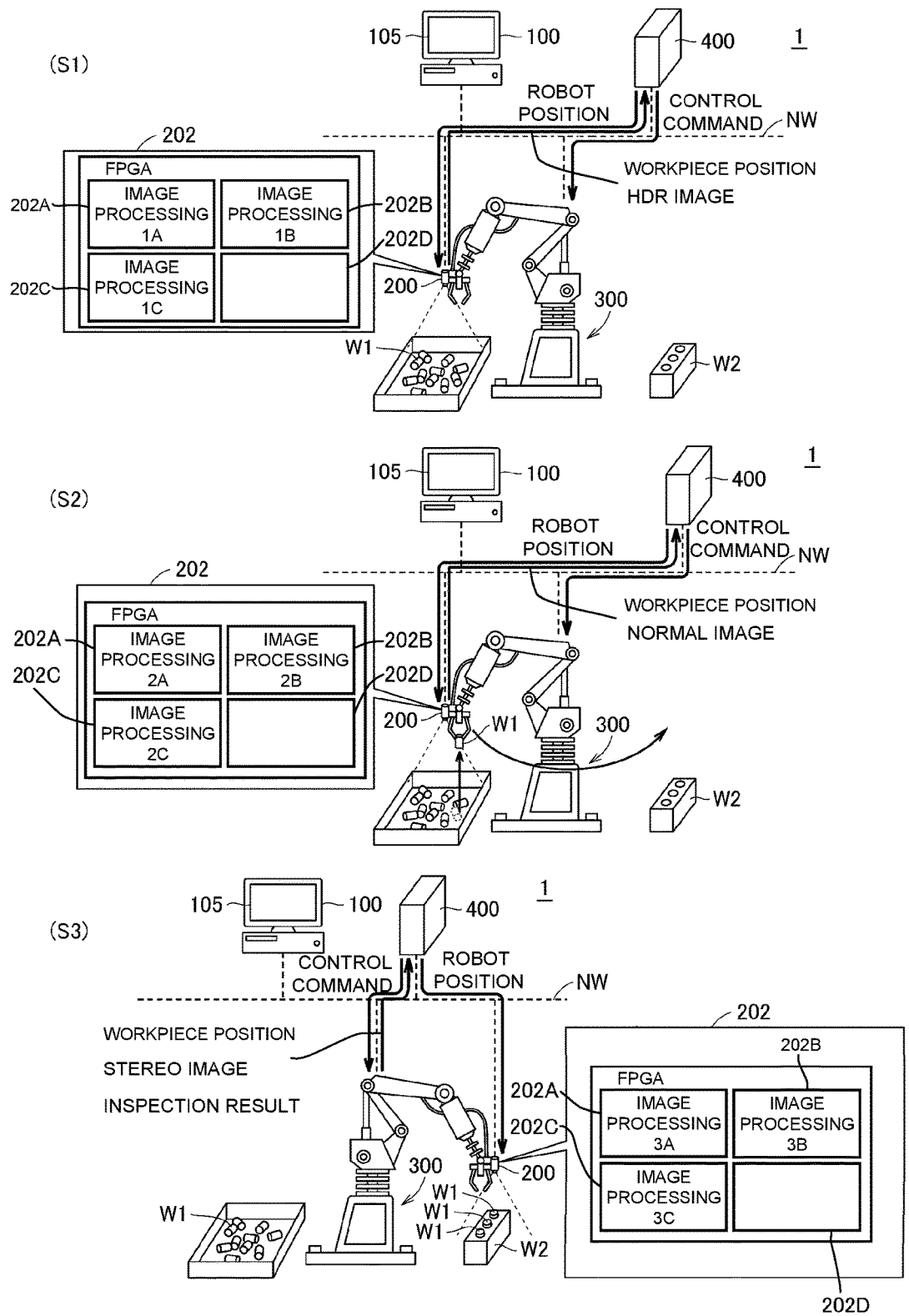
FIG. 2 is a diagram illustrating an example of an operation process of a robot according to an embodiment.

Hereinafter, a specific example of an FPGA reconfiguration process will be described with reference to FIG. 2. FIG. 2 is a diagram illustrating an example of an operation process of the robot 300.

For example, the image processing device 200 includes an FPGA 202. The FPGA 202 has circuit regions 202A to 202D capable of being reconfigured.

In the example of FIG. 2, a process of picking up the workpiece W1 (step S1), a process of moving the workpiece W1 (step S2), and a process of attaching the workpiece W1 to the workpiece W2 (step S3) are shown in time series. The processing shown in steps S1 to S3 is iterated, so that an operation is implemented in an assembly of the workpieces W1 and W2.

More specifically, in step S1, the image processing device 200 periodically acquires a position of the robot 300 from the controller 400. The image processing device 200 determines whether or not to reconfigure the circuit configuration of the FPGA 202 on the basis of the current position of the robot 300. For example, it is determined whether or not to reconfigure the circuit configuration of the FPGA 202 on the basis of area information 144A to be described below. Although details thereof will be described below, a relationship between the operation area of the robot 300 and the image processing of the execution target is defined in the area information 144A. The image processing device 200 determines whether or not a current position of the robot 300 belongs to any one of operation areas defined in the area information 144A. The term "belong" used here indicates that the current position of the robot 300 is included in the operation area defined in the area information 144A. If it is determined that the current position of the robot 300 belongs to any one of operation areas defined in the area information 144A, the circuit configuration of the FPGA 202 is reconfigured with the circuit information associated with the operation area. In the example of step S1, the circuit region 202A is transferred to a circuit configuration for implementing the image processing 1A. The circuit region 202B is transferred to a circuit configuration for implementing the image processing 1B. The circuit region 202C is transferred to a circuit configuration for implementing the image processing 1C.

In order to accurately pick up the workpiece W1 in the pickup process of step S1, it is necessary for the position of the workpiece W1 to be accurately detected. Thus, typically, any one of the image processing 1A to 1C includes a process of implementing image quality improvement. As an example, the process is high dynamic range (HDR) combining. The HDR combining effectively operates in a case in which halation occurs such as a case in which a glossy workpiece is photographed. The image processing device 200 generates an HDR image by performing HDR combining on a plurality of images obtained from the photographing unit (the camera). Thereafter, the image processing device 200 detects the workpiece W1 from the generated HDR image. In a process of detecting the workpiece W1, for example, existing image processing technology such as template matching is adopted. The image processing device 200 transmits the position of the workpiece W1 within the image to the controller 400.

The controller 400 converts a coordinate value of the camera coordinate system into a coordinate value of the world coordinate system in accordance with a predetermined conversion equation. The controller 400 outputs a control command to the robot 300 in accordance with the converted coordinate value and implements the process of picking up the workpiece W1.

In step S2, the robot 300 executes an operation of moving the workpiece W1. In this process, the image processing device 200 subsequently acquires the current position of the robot 300 and determines whether or not the current position of the robot 300 belongs to any one of the operation areas defined in the area information 144A. If it is determined that the current position of the robot 300 belongs to any one of the operation areas defined in the area information 144A, the image processing device 200 reconfigures the circuit configuration of the FPGA 202 with the circuit information associated with the operation area. In the example of step S2, the circuit region 202A is transferred to a circuit configuration for implementing the image processing 2A. The circuit region 202B is transferred to a circuit configuration for implementing the image processing 2B. The circuit region 202C is transferred to a circuit configuration for implementing the image processing 2C.

Normally, when the workpiece W1 is moved, image quality is not important. Thus, the image processing device 200 executes a normal photographing process. That is, the image processing device 200 does not perform high-quality processing such as HDR combining.

In step S3, the robot 300 inspects the workpieces W1 and W2 after the workpiece W1 is attached to the workpiece W2. In this process, the image processing device 200 subsequently acquires the current position of the robot 300 and determines whether or not the current position of the robot 300 belongs to any one of the operation areas defined in the area information 144A. If it is determined that the current position of the robot 300 belongs to any one of the operation areas defined in the area information 144A, the image processing device 200 reconfigures the circuit configuration of the FPGA 202 with the circuit information associated with the operation area. In the example of step S3, the circuit region 202A is transferred to a circuit configuration for implementing the image processing 3A. The circuit region 202B is transferred to a circuit configuration for implementing the image processing 3B. The circuit region 202C is transferred to a circuit configuration for implementing the image processing 3C.

Typically, any one of image processing 3A to 3C includes image processing for generating a stereo image (for example, an illuminance difference stereo method). The image processing device 200 executes the inspection of the workpiece W1 and W2 on the basis of a three-dimensional image obtained by the illuminance difference stereo method. For example, an attachment position of the workpiece W1, the presence or absence of scratches of the workpieces W1 and W2, and the like are inspected. For example, an inspection result is displayed on a display device (for example, a human machine interface (HMI)) (not illustrated) provided in the image processing device 200.

[C. Data Flow of Image Processing System 1]

Figure 3:
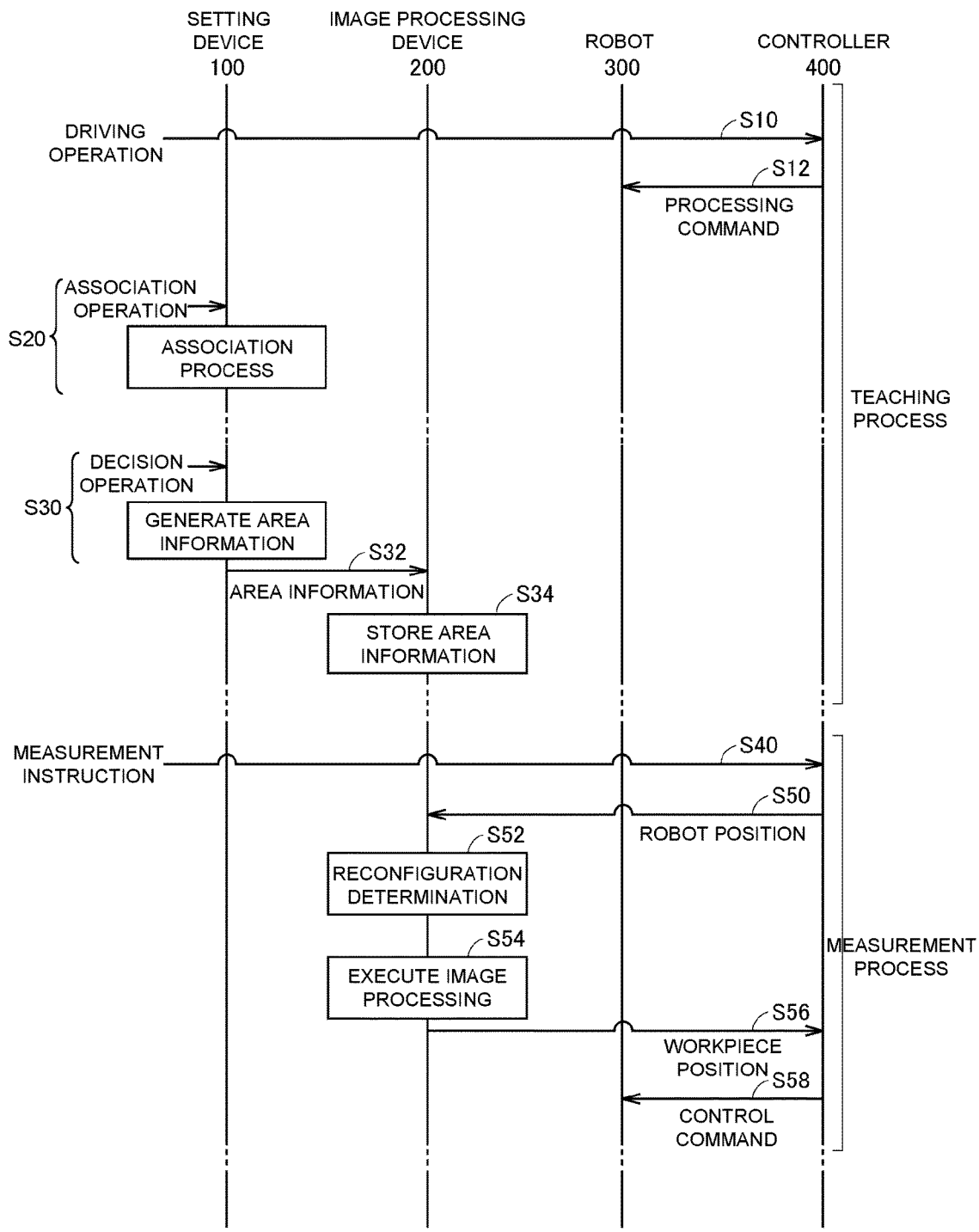
FIG. 3 is a sequence diagram illustrating a flow of data between a setting device, an image processing device, a robot, and a controller according to an embodiment.

A flow of data in the image processing system 1 will be described with reference to FIG. 3. FIG. 3 is a sequence diagram illustrating a flow of data between the setting device 100, the image processing device 200, the robot 300, and the controller 400.

A user performs a setting process of associating the operation area of the robot 300 and the image processing of an execution target in the operation area (hereinafter referred to as a "teaching process") previous to the execution of the workpiece measurement process. Thereafter, the image processing system 1 executes the workpiece measurement process in accordance with a teaching process result.

Hereinafter, the teaching process and the workpiece measurement process will be sequentially described.

(C1. Teaching Process)

In step S10, the user performs a driving operation of designating a position of the robot 300. The driving operation is performed on an operation unit of operating the robot 300. As an example, an operation terminal specific to the robot 300 may be used as the operation unit, or a keyboard, a mouse, or the like connected to the setting device 100 may be used as the operation unit.

In step S12, the controller 400 generates a control command in accordance with the driving operation of the robot 300 and outputs the control command to the robot 300. Thereby, the robot 300 moves in accordance with the driving operation from the user.

Figure 4A:
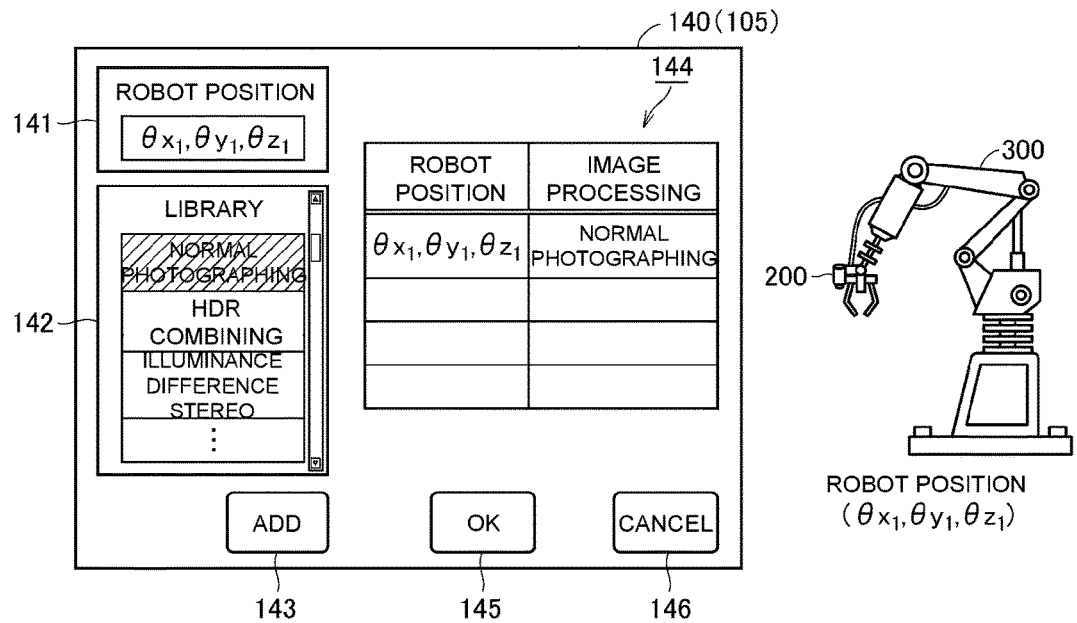
FIG. 4(A) and FIG. 4(B) are diagrams illustrating a user interface for associating a position of the robot and image processing to be executed at the position according to an embodiment.
Figure 4B:
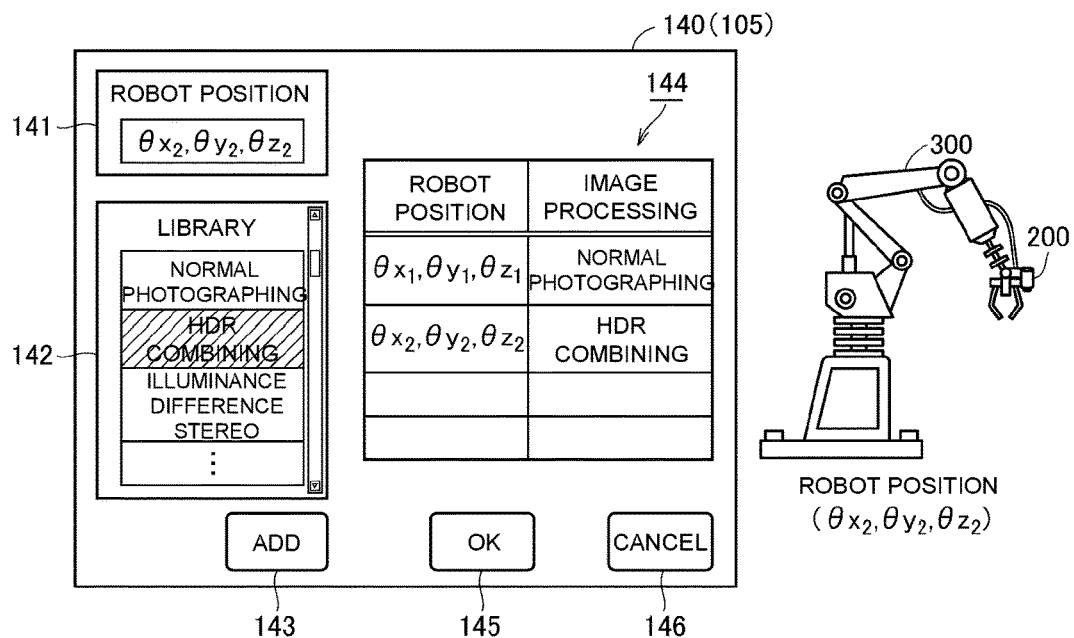

In step S20, the user performs an operation of associating an operation of selecting the imaging processing on the setting device 100 with the current position of the robot 300. For example, this operation is performed on a user interface 140 illustrated in FIG. 4(A) and FIG. 4(B). FIG. 4(A) and FIG. 4(B) are diagrams illustrating the user interface 140 for associating a position of the robot 300 and image processing to be executed at the position. For example, the user interface 140 is displayed on the display unit 105 of the setting device 100.

The user interface 140 includes a position display region 141 for displaying the current position of the robot 300. Typically, the current position corresponds to an arm position of the robot 300. The current position of the robot 300 may be indicated by a rotation angle of a motor configured to drive the robot 300 or indicated by a three-dimensional coordinate value. The current position of the robot 300 displayed in the position display region 141 is updated in conjunction with driving of the robot 300. Thereby, the user can accurately ascertain the position of the robot. In some embodiments, the user interface 140 may display an image indicating the robot 300 and update the image in accordance with an orientation of the robot 300. Thereby, the user can intuitively understand the orientation of the robot 300. In particular, this effect is remarkable when the user cannot directly check on the robot 300.

The user interface 140 displays an image processing list 142 pre-installed in the image processing device 200. Also, the user interface 140 is configured to receive a selection operation of selecting one or more image processings from one or more image processings shown in the list 142. That is, the user can select one or more image processings from the list 142. When the user presses an add button 143 after selecting the image processing from the list 142, the current position of the robot 300 is associated with the selected image processing in the list 144. In this manner, the user interface 140 is configured so that a registration operation (for example, pressing of the add button 143 or the like) is received after the position of the robot 300 is designated. In an example of FIG. 4(A), a robot position ($\theta_{x1}$, $\theta_{y1}$, $\theta_{z1}$) and image processing "normal photographing" are associated according to a registration operation.

The user iterates an operation of designating the position of the robot 300 and an operation of selecting the image processing. In example of FIG. 4(B), a robot position ($\theta_{x2}$, $\theta_{y2}$, $\theta_{z2}$) and image processing "HDR combining" are further associated.

In step S30, the user is assumed to press an OK button 145. In step S32, the setting device 100 generates the area information 144A illustrated in FIG. 5 on the basis of a press operation on the OK button 145. FIG. 5 is a diagram illustrating an example of the area information 144A.

The area information 144A is generated on the basis of a relationship between the robot position and the image processing associated in the list 144 of the user interface 140. More specifically, the setting device 100 calculates the operation area of the robot 300 from each robot position registered in the list 144. Conversion from the registered robot position to the operation area is performed on the basis of a predetermined conversion equation. Typically, the operation area corresponds to a neighboring region including the registered robot position and corresponds to a region within a predetermined distance from the registered robot position. In this case, the operation area becomes spherical. Also, it is unnecessary for the operation area to be spherical. The operation area may have another shape such as a cube.

Also, the image processing device 200 acquires circuit information for implementing image processing shown in the list 144. For example, the circuit information is indicated by a command code (a program) for configuring a circuit of the FPGA 202. Thereafter, the image processing device 200 associates the operation area calculated from each robot position with the circuit information. Thereby, in the area information 144A, the operation area of the robot 300 and the circuit information for implementing image processing to be executed in the operation area are associated.

In step S32, the setting device 100 transmits the generated area information 144A to the image processing device 200. In step S34, the image processing device 200 stores the area information 144A received from the setting device 100.

In this manner, the user interface 140 is configured to receive a registration operation of registering the image processing selected by the user and an operation area including the current position of the robot 300 in the area information 144A. This user interface 14 is provided so that the user can easily associate the operation area of the robot and the image processing to be executed in the operation area.

(C2. Measurement Process)

Next, a workpiece measurement process by the setting device 100 will be described with reference to FIG. 3.

In step S40, the controller 400 is assumed to have received a workpiece measurement instruction. For example, the workpiece measurement instruction is issued every time an image is obtained from the image processing device 200. Alternatively, the workpiece measurement instruction is issued at each predetermined interval.

In step S50, the controller 400 transmits the current position of the robot 300 to the image processing device 200. The current position of the robot 300 may be indicated by a rotation angle of a motor configured to drive the robot 300 or may be indicated by a three-dimensional coordinate value.

In step S52, the image processing device 200 determines whether or not the current position of the robot 300 belongs to any one of the operation areas defined in the area information 144A. If it is determined that the current position of the robot 300 belongs to any one of the operation areas defined in the area information 144A, the image processing device 200 re-connects the circuit element of the FPGA 202 in accordance with the circuit information associated with the operation area and reconfigures the circuit configuration. Otherwise, the reconfiguration of the FPGA 202 is not executed.

In step S54, the image processing device 200 executes image processing according to the circuit configuration of the FPGA 202. As an example, an image processing execution instruction is issued every time an image is acquired from the photographing unit of the image processing device 200. As an example of image processing to be executed, the image processing device 200 executes image processing for implementing workpiece detection (for example, template matching).

In step S56, the image processing device 200 transmits the detected workpiece position to the controller 400. For example, a workpiece position is indicated by a camera coordinate system.

In step S58, the controller 400 converts the workpiece position of the camera coordinate system into a coordinate value of the world coordinate system in accordance with a predetermined conversion equation. The controller 400 outputs a control command to the robot 300 in accordance with the converted coordinate value and implements a workpiece pickup process or the like.

The processing of steps S50 to S58 is iterated, so that the circuit configuration of the FPGA 202 is reconfigured in accordance with a position of the robot 300.

[D. Functional Configuration of Setting Device 100]

Figure 6:
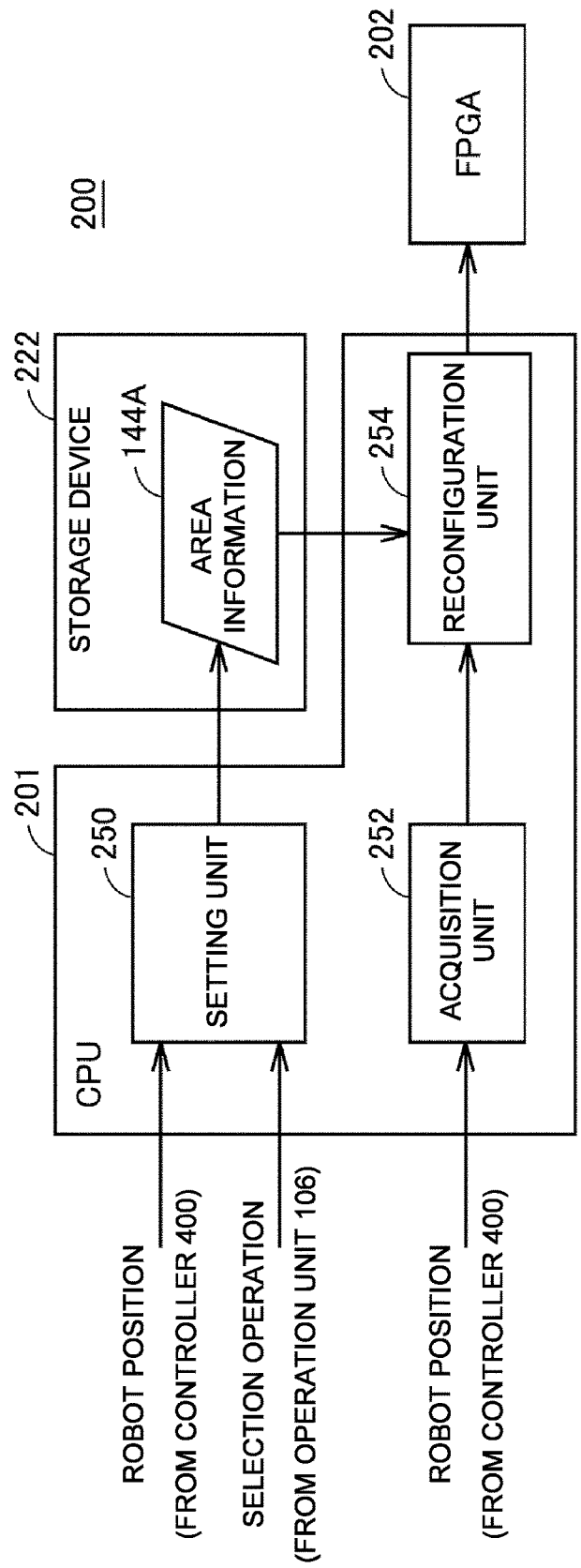
FIG. 6 is a diagram illustrating an example of a functional configuration of an image processing device according to an embodiment.

A function of the image processing device 200 will be described with reference to FIG. 6. FIG. 6 is a diagram illustrating an example of a functional configuration of the image processing device 200.

As illustrated in FIG. 6, the image processing device 200 includes the CPU 201, the FPGA 202, and the storage device 222 as main hardware components. The CPU 201 includes a setting unit 250, an acquisition unit 252, and a reconfiguration unit 254 as functional components.

The setting unit 250 provides the above-described user interface 140 (see FIG. 4(A) and FIG. 4(B)). The user interface 140 is configured to receive a selection operation of selecting one or more image processings from among a plurality of image processings installed in advance. Also, the user interface 140 is configured to receive a registration operation of registering selected image processing and an operation area including a current position of the robot 300 in the above-described area information 144A.

The acquisition unit 252 acquires the current position of the robot 300 from the controller 400. Typically, the position information of the robot 300 received from the controller 400 corresponds to a target position output by the controller 400 when the robot 300 is driven. That is, the controller 400 transmits a position designated as a driving destination of the robot 300 as the current position of the robot 300 to the acquisition unit 252 of the image processing device 200.

The current position of the robot 300 is periodically acquired. Typically, the current position of the robot 300 is transmitted from the controller 400 at a regular communication interval. Alternatively, the current position of the robot 300 is transmitted from the controller 400 in accordance with an acquisition request from the acquisition unit 252. The acquisition unit 252 outputs the current position to the reconfiguration unit 254 every time the current position of the robot 300 is acquired.

Also, the acquisition unit 252 may acquire the current position of the robot 300 in a method different from the above-described method. For example, a Global Positioning System (GPS) unit may be configured in the robot 300 and the acquisition unit 252 may be configured to acquire position information of the robot 300 from the GPS unit.

The reconfiguration unit 254 reconfigures the circuit configuration of the FPGA 202 with circuit information associated with the operation area on the basis of the fact that the current position of the robot 300 sequentially acquired by the acquisition unit 252 belongs to any one of the operation areas defined in the area information 144A. Thereby, the reconfiguration unit 254 can reconfigure the circuit configuration of the FPGA 202 in accordance with a state of the robot 300.

Also, the reconfiguration unit 254 may reconfigure the FPGA 202 on the basis of information other than the position information of the robot 300. As an example, the reconfiguration unit 254 may reconfigure the FPGA 202 on the basis of time information. More specifically, each of the image processing device 200 and the controller 400 has a timer synchronized with a clock time. The controller 400 drives the robot 300 in accordance with time information of the timer. That is, the time information indicated by the timer is mutually associated with the position of the robot 300. In this manner, because the time information of the timer indirectly indicates the position of the robot 300, reconfiguring the circuit configuration of the FPGA 202 on the basis of the time information of the timer has the same meaning as reconfiguring the circuit configuration of the FPGA 202 on the basis of the position information of the robot 300.

[E. Control Structure of Image Processing Device 200]

Figure 7:
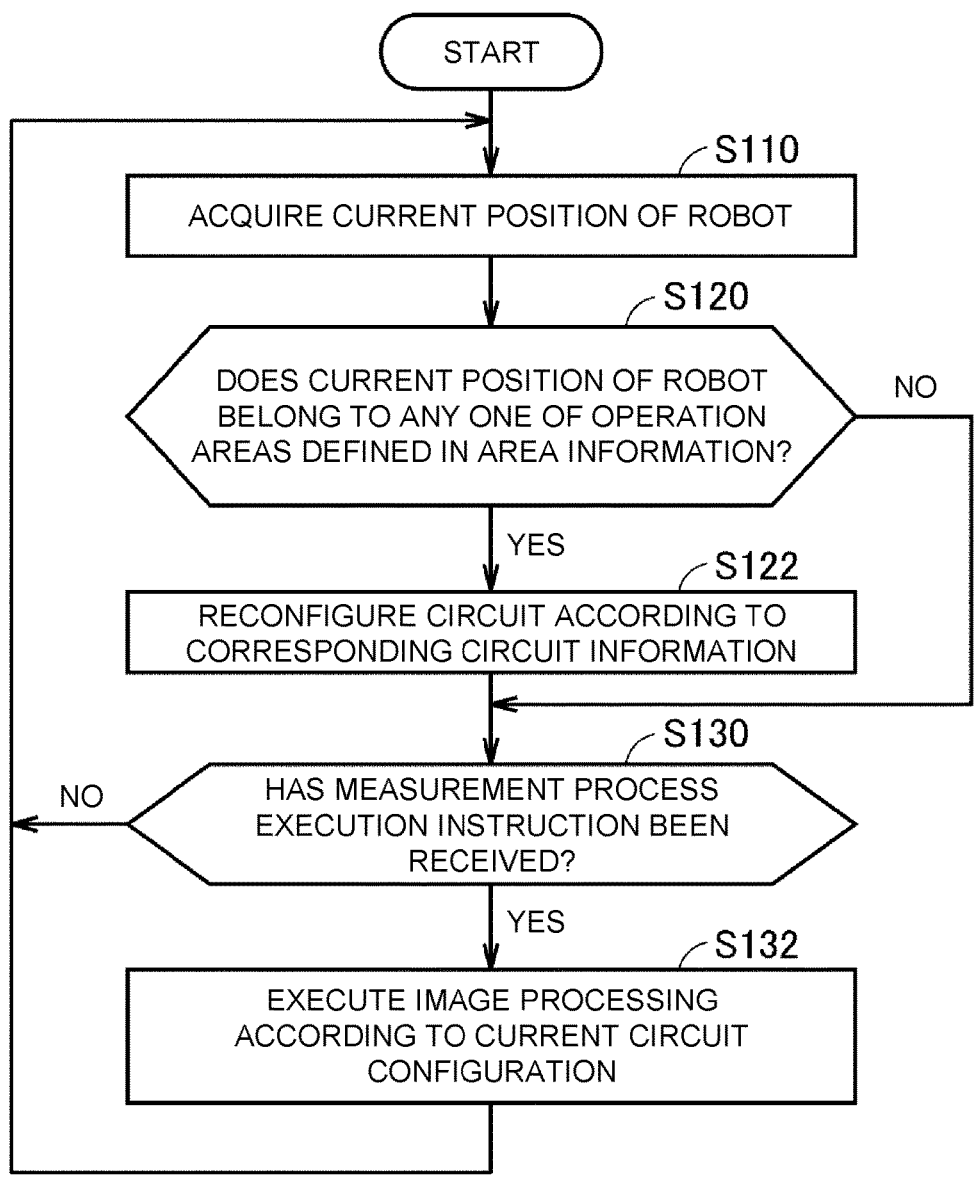
FIG. 7 is a flowchart illustrating a measurement process by the image processing device according to an embodiment.

A control structure of the image processing device will be described with reference to FIG. 7. FIG. 7 is a flowchart illustrating a measurement process by the image processing device 200. The process of FIG. 7 is implemented by the CPU 201 (see FIG. 6) of the image processing device 200 executing the program. In another aspect, some or all of the processes may be executed by the FPGA 202 (see FIG. 6), a circuit element, or other hardware.

In step S110, the CPU 201, serving as the above-described acquisition unit 252 (see FIG. 6), acquires the current position of the robot 300 from the controller 400.

In step S120, the CPU 201 determines whether or not the current position of the robot 300 acquired in step S110 belongs to any one of operation areas defined in the above-described area information 144A (see FIG. 5). As an example, if the operation area defined in the area information 144A is defined by a center point and a radius (that is, if the operation area is spherical), it is determined that the current position of the robot 300 belongs to the operation area when a distance between the current position of the robot 300 and the center point is shorter than the radius. If the CPU 201 determines that the current position of the robot 300 acquired in step S110 belongs to any one of the operation areas defined in the above-described area information 144A (YES in step S120), the control is switched to step S122. Otherwise (NO in step S120), the CPU 201 switches the control to step S130.

In step S122, the CPU 201 specifies the circuit information associated with the operation area to which the current position of the robot 300 belongs in the area information 144A. For example, the circuit information is indicated by a command code (a program) for configuring a circuit of the FPGA 202 and the CPU 201 reconfigures the circuit configuration of the FPGA 202 in accordance with the command code.

In step S130, the CPU 201 determines whether or not an instruction for executing a workpiece measurement process has been received. For example, the instruction is issued every time the photographing unit (the camera) of the image processing device 200 captures an image. If the CPU 201 determines that the instruction for executing the workpiece measurement process has been received (YES in step S130), the control is switched to step S132. Otherwise (NO in step S130), the CPU 201 returns the control to step S110.

In step S132, the CPU 201 executes image processing according to a current circuit configuration. Thereby, the workpiece measurement process is implemented.

[F. Hardware Configuration]

Figure 8:
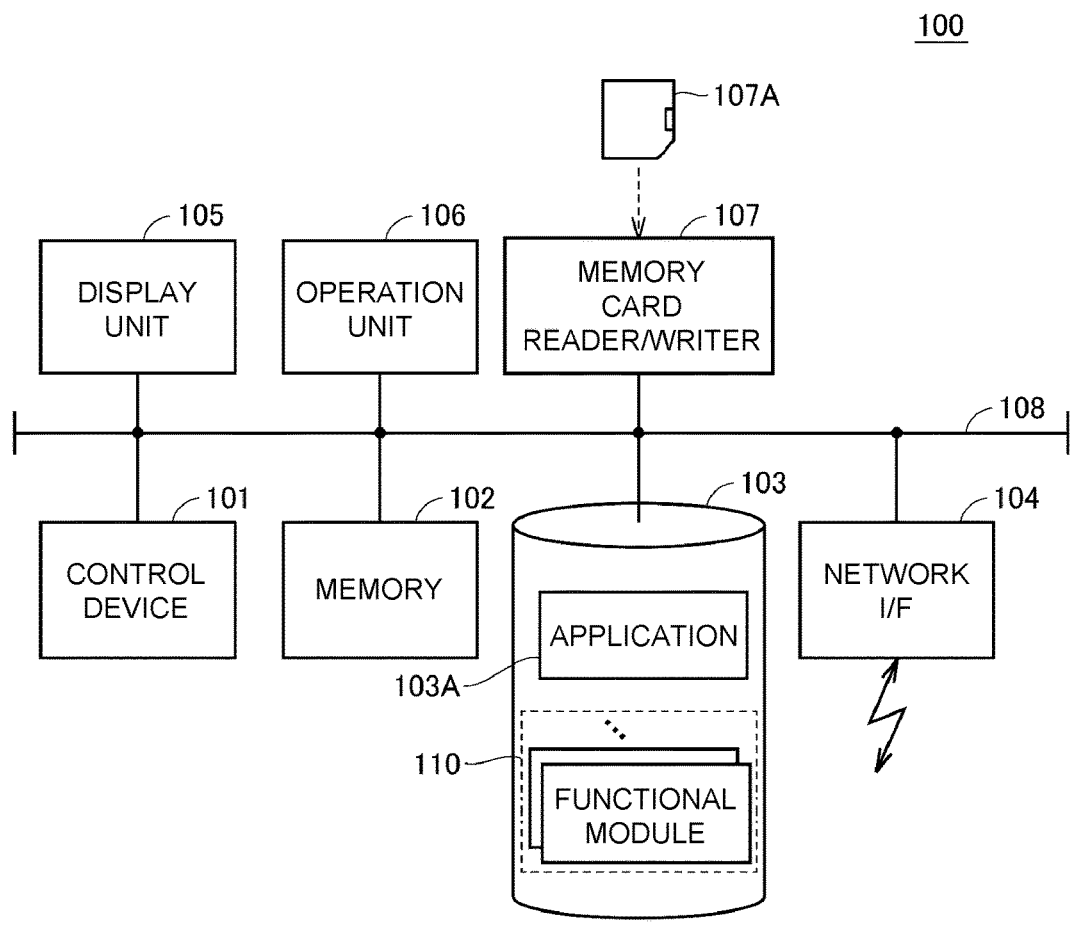
FIG. 8 is a block diagram illustrating a main hardware configuration of the setting device according to an embodiment.
Figure 9:
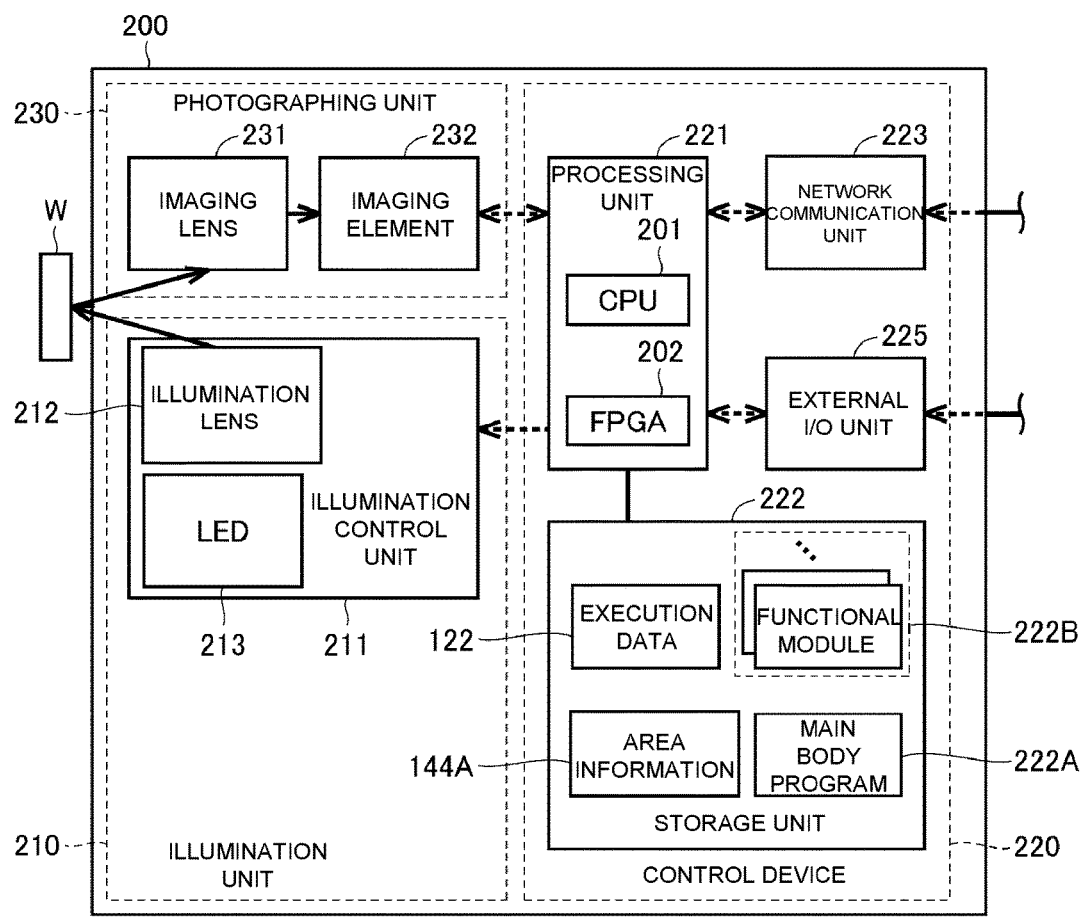
FIG. 9 is a block diagram illustrating a main hardware configuration of the image processing device according to an embodiment.
Figure 10:
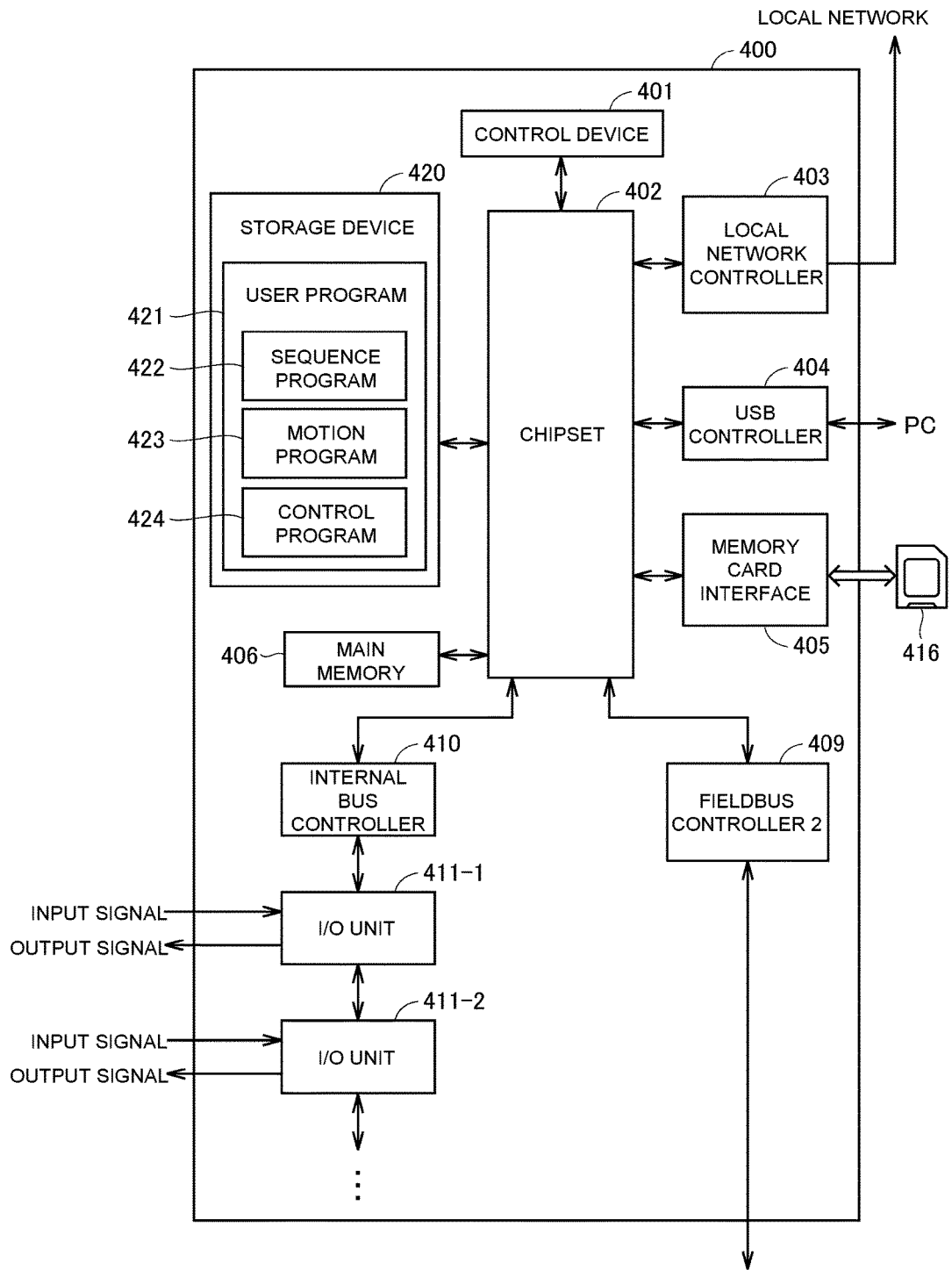
FIG. 10 is a block diagram illustrating a main hardware configuration of the controller according to an embodiment.

A hardware configuration of each device constituting the image processing system 1 will be described with reference to FIGS. 8 to 10. FIG. 8 is a block diagram illustrating a main hardware configuration of the setting device 100 constituting the image processing system 1. FIG. 9 is a block diagram illustrating a main hardware configuration of the image processing device 200 constituting the image processing system 1. FIG. 10 is a block diagram illustrating a main hardware configuration of the controller 400 constituting the image processing system 1.

(F1: Setting Device 100)

The setting device 100 is, for example, implemented by a general-purpose computer. The computer for implementing the setting device 100 includes a control device 101, a memory 102, a storage device 103 such as a hard disk drive (HDD), a network interface (I/F) 104, a display unit 105, an operation unit 106, and a memory card reader/writer 107. These parts are connected so that they can communicate with each other via an internal bus 108.

The control device 101 implements the above-described various types of functions by executing a program (a command code) stored in the storage device 103 or the like after the program (the command code) is loaded to the memory 102. The memory 102 and the storage device 103 store data in a volatile manner and a non-volatile manner, respectively. In addition to an operating system (OS), the storage device 103 holds an application 103A and a library 110 including a plurality of functional modules (image processings).

The application 103A is a basic program for providing the above-described user interface 140 (see FIG. 4). All or a part of the library 110 is transmitted to the image processing device 200 in accordance with a user operation. That is, the library 222B (see FIG. 9) stored in the storage device 222 of the image processing device 200 is at least a subset of the library 110 stored in the storage device 103 of the setting device 100.

The network interface 104 exchanges data between the setting device 100 and the image processing device 200 via the network NW (see FIG. 1).

The display unit 105 displays a setting operation screen (for example, the user interface 140) or the like implemented when the control device 101 executes the application 103A. The display unit 105 includes a display such as a liquid crystal display (LCD) or the like.

The operation unit 106 receives a user operation and outputs an internal command indicating the received operation to the control device 101 or the like. Typically, the operation unit 106 includes a keyboard, a mouse, a touch panel, a tablet, an audio recognition device, and the like. For example, the user designates the position of the robot 300 by operating the operation unit 106.

The memory card reader/writer 107 reads data from a memory card 107A and writes the data to the memory card 107A. A well-known recording medium such as a secure digital (SD) card can be adopted as the memory card 107A.

(F2: Image Processing Device 200)

Next, a device configuration of the image processing device 20 will be described with reference to FIG. 9. The image processing device 200 includes an illumination unit 210, a control device 220, and an imaging unit 230.

The illumination unit 210 radiates light necessary for imaging a workpiece W to be inspected. That is, the illumination unit 210 radiates light in an imaging range of the imaging unit 230. More specifically, the illumination unit 210 includes a plurality of illumination control units 211 provided on an illumination substrate. These units are arranged on the illumination substrate. Each illumination control unit 211 includes an illumination lens 212 and an LED 213. The illumination control unit 211 radiates light in accordance with a command from the control device 220. More specifically, light generated by the LED 213 is radiated to the workpiece W through the illumination lens 212.

The imaging unit 230 receives reflected light of light radiated by the illumination unit 210 and outputs an image signal. This image signal is sent to the control device 220. More specifically, the imaging unit 230 includes an imaging element 232 divided into a plurality of pixels of a coupled charged device (CCD) or complementary metal oxide semiconductor (CMOS) image sensor or the like in addition to an optical system such as an imaging lens 231.

The control device 220 controls the entire image processing device 200. That is, the control device 220 controls the illumination unit 210 and the imaging unit 230 and performs image processing on the basis of an image signal from the imaging unit 230. More specifically, the control device 220 includes a processing unit 221, a storage device 222, a network communication unit 223, and an external input/output (I/O) unit 225.

The processing unit 221 is constituted of an integrated circuit such as the CPU 202 or the FPGA 202. Alternatively, the processing unit 221 may be constituted of a digital signal processor (DSP), a graphics processing unit (GPU), an application specific integrated circuit (ASIC), or another integrated circuit.

The storage device 222 includes non-volatile storage devices such as a read only memory (ROM), a flash memory, an HDD, and a static silicon disk (SSD) and/or a non-volatile memory such as a radon access memory (RAM). Typically, the processing unit 221 implements various types of image processing by executing a program (a command code) stored in the storage device 222, a module, or the like.

Such a program (command code) or module or the like is stored in the non-volatile memory of the storage device 222 and a program read from the non-volatile memory, workpiece data necessary for execution of the program, image data acquired by the imaging unit 230, data indicating a measurement result, and the like are stored in the volatile memory of the storage device 222.

More specifically, the storage device 222 includes execution data 122 for implementing a user-set measurement process, the above-described area information 144A (see FIG. 5), a main body program 222A, and a library 222B including various functional modules (image processings).

The main body program 222A is a basic program for implementing a basic operation of the image processing device 200 and can include an OS and a basic application. The library 222B includes a plurality of programs for implementing an image processing function provided by the image processing device 200 (typically, a command code and/or a library). Programs equal in number to image processing functions capable of being executed by the image processing device 200 are installed. As described above, the library 222B is at least a subset of the library 110 stored in the storage device 103 of the setting device 100.

The network communication unit 223 is an interface for exchanging data with the setting device 100 or the like via the network NW. More specifically, a configuration according to Ethernet is adopted in the network communication unit 223. The external I/O unit 225 is an interface for exchanging various types of data (input data and/or output data) with the controller 400.

(F3: Controller 400)

Next, a device configuration of the controller 400 will be described with reference to FIG. 10.

The controller 400 includes a control device 401 such as a CPU or an MPU, a chip set 402, a main memory 406, a storage device 420, a local network controller 403, a universal serial bus (USB) controller 404, a memory card interface 405, an internal bus controller 410, a fieldbus controller 409, I/O units 411-1, 411-2, and the like.

The control device 401 implements control according to a control target, a process, and the like according to the present embodiment by reading various programs stored in the storage device 420, loading the read programs to the main memory 406 and executing the programs. The chip set 402 implements a process as the entire controller 400 by controlling the control device 401 and each component.

The storage device 420 is, for example, a secondary storage device. In addition to a system program for implementing a PLC engine, the storage device 420 stores a user program 421 to be executed using the PLC engine and the like. The user program 421 includes a sequence program 422 configured to mainly perform a logical operation, a motion program 423 configured to mainly perform a numerical operation such as position control or speed control, a control program 424 of the controller 400, and the like.

The local network controller 403 controls exchange of data with another device (for example, a server or the like) via the local network. The USB controller 404 controls exchange of data with another device (for example, a personal computer (PC) or the like) via a USB connection.

The memory card interface 405 is configured so that the memory card 416 can be attached or detached, and is able to write data to the memory card 416 and read various data (a user program, trace data, and the like) from the memory card 416.

The internal bus controller 410 is an interface configured to exchange data with the I/O units 411-1, 411-2, and the like mounted on the controller 400.

The fieldbus controller 409 controls exchange of data with other devices (for example, the setting device 100, the image processing device 200, and the robot 300) via the network NW (see FIG. 1).

Although a configuration example in which a necessary function is provided when the control device 401 executes the program is illustrated in FIG. 10, some or all of the provided functions may be implemented using a dedicated hardware circuit (for example, an application specific integrated circuit (ASIC), an FPGA, or the like). Alternatively, a main part of the controller 400 may be implemented using hardware (for example, an industrial personal computer in which a general personal computer is installed) according to a general architecture. In this case, a plurality of OSs having different fields of applications may be configured to be executed in parallel using virtualization technology and a necessary application may be configured to be executed on each OS.

[G. Conclusion]

As described above, the setting device 100 provides the user interface 140 for associating an operation area of the robot 300 and image processing to be executed in the operation area. According to a setting process on the user interface 140, circuit information for executing set image processing is associated with each operation area of the robot 300 in the area information 144A. The image processing device 200 reconfigures the circuit configuration of the FPGA 202 with the circuit information associated with the operation area on the basis of the fact that a current position of the robot 300 belongs to any one of the operation areas defined in the area information 144A. Thereby, the image processing device 200 can reconfigure the circuit configuration of the FPGA 202 in accordance with a position of the robot 300 and a user-set measurement process is executed in accordance with the position of the robot 300.

The presently disclosed embodiments should be considered in all respects as illustrative and not restrictive. The scope of the invention is indicated by the appended claims, rather than the foregoing description, and all changes which come within the meaning and range of equivalency of the claims are therefore intended to be included therein.

What is claimed is:

1. An image processing system comprising:
    a robot, performing a predetermined operation on a workpiece;
    a photographing unit, photographing the workpiece;
    a field programmable gate array (FPGA), reconfiguring an internal circuit configuration;
    a storage unit, storing area information in which circuit information for implementing predetermined image processing on an image obtained from the photographing unit as information for defining the circuit configuration of the FPGA is defined for each operation area of the robot; and
    a processor, reconfiguring the circuit configuration of the FPGA with the circuit information associated with the operation area on the basis of the fact that a position of the robot sequentially acquired on the basis of time information synchronized with a timer of a controller driving the robot belongs to any one of operation areas defined in the area information.

2. The image processing system according to claim 1, wherein the processor provides a user interface for setting the area information,
    wherein the user interface is configured to receive a selection operation of selecting one or more image processings from among one or more image processings installed in advance, and
    wherein the user interface is configured to receive a registration operation of registering the image processing selected in the selection operation and an operation area including a current position of the robot in the area information.

3. The image processing system according to claim 2, further comprising:
    an operation unit, receiving a driving operation of driving the robot,
    wherein the user interface is configured to receive the registration operation after a position of the robot is designated in the driving operation.

4. The image processing system according to claim 3, wherein the user interface displays a current position of the robot in conjunction with driving of the robot by the driving operation.

5. The image processing system according to claim 1, wherein the FPGA executes image processing on an image according to a current circuit configuration on the basis of acquisition of the image from the photographing unit.

6. An image processing device configured to communicate with a robot for performing a predetermined operation on a workpiece, the image processing device comprising:
    a photographing unit, photographing the workpiece;
    an FPGA, reconfiguring an internal circuit configuration;
    a storage unit, storing area information in which circuit information for implementing predetermined image processing on an image obtained from the photographing unit as information for defining the circuit configuration of the field programmable gate array (FPGA) is defined for each operation area of the robot; and
    a processor, reconfiguring the circuit configuration of the FPGA with the circuit information associated with the operation area on the basis of the fact that a position of the robot sequentially acquired on the basis of time information synchronized with a timer of a controller driving the robot belongs to any one of operation areas defined in the area information.

7. A method of reconfiguring a circuit in a field programmable gate array (FPGA), the method comprising the steps of:
    acquiring a position of a robot for performing a predetermined operation on a workpiece on the basis of time information synchronized with a timer of a controller driving the robot;
    preparing area information in which circuit information for implementing predetermined image processing on an image obtained by photographing the workpiece as information for defining the circuit configuration of the FPGA is defined for each operation area of the robot; and reconfiguring the circuit configuration of the FPGA with the circuit information associated with the operation area on the basis of the fact that a position of the robot sequentially acquired in the acquiring step belongs to any one of operation areas defined in the area information.

8. A non-transitory recording medium, recording a program for reconfiguring a circuit in a field programmable gate array (FPGA), the program causing a computer to execute the steps of:

acquiring a position of a robot for performing a predetermined operation on a workpiece on the basis of time information synchronized with a timer of a controller driving the robot;

preparing area information in which circuit information for implementing predetermined image processing on an image obtained by photographing the workpiece as information for defining the circuit configuration of the FPGA is defined for each operation area of the robot; and reconfiguring the circuit configuration of the FPGA with the circuit information associated with the operation area on the basis of the fact that a position of the robot sequentially acquired in the acquiring step belongs to any one of operation areas defined in the area information.

* * * * *